United States Patent
Vonog et al.

(10) Patent No.: US 9,172,979 B2
(45) Date of Patent: Oct. 27, 2015

(54) EXPERIENCE OR "SENTIO" CODECS, AND METHODS AND SYSTEMS FOR IMPROVING QOE AND ENCODING BASED ON QOE EXPERIENCES

(75) Inventors: Stanislav Vonog, San Francisco, CA (US); Nikolay Surin, San Francisco, CA (US); Tara Lemmey, San Francisco, CA (US)

(73) Assignee: NET POWER AND LIGHT, INC., San Francisco, CA (US)

( * ) Notice: Subject to any disclaimer, the term of this patent is extended or adjusted under 35 U.S.C. 154(b) by 597 days.

(21) Appl. No.: 13/136,870

(22) Filed: Aug. 12, 2011

(65) Prior Publication Data

US 2012/0039382 A1   Feb. 16, 2012

Related U.S. Application Data

(60) Provisional application No. 61/373,236, filed on Aug. 12, 2010.

(51) Int. Cl.
- *H04N 7/12* (2006.01)
- *H04N 21/2343* (2011.01)
- *H04N 21/2662* (2011.01)

(Continued)

(52) U.S. Cl.
CPC ........... *H04N 21/2343* (2013.01); *H04N 19/12* (2014.11); *H04N 19/156* (2014.11); *H04N 19/164* (2014.11); *H04N 21/234327* (2013.01); *H04N 21/234345* (2013.01); *H04N 21/2662* (2013.01); *H04N 21/631* (2013.01);

(Continued)

(58) Field of Classification Search
USPC .............. 348/474, 578; 375/240–240.29; 345/757, 173, 158; 463/42; 455/566
See application file for complete search history.

(56) References Cited

U.S. PATENT DOCUMENTS

5,491,743 A * 2/1996 Shiio et al. ................. 348/578
6,144,991 A    11/2000 England (Continued)

FOREIGN PATENT DOCUMENTS

JP    2010-016662 A    1/2010
KR  10-2002-0038738 A  5/2002

(Continued)

OTHER PUBLICATIONS

International Search Report mailed May 16, 2012 of PCT Application No. PCT/US2011/057385, 9 pages.

(Continued)

*Primary Examiner* — David Czekaj
*Assistant Examiner* — Shanika Brumfield
(74) *Attorney, Agent, or Firm* — Perkins Coie LLP (57) ABSTRACT

Certain embodiments teach a variety of experience or "sentio" codecs, and methods and systems for enabling an experience platform, as well as a Quality of Experience (QoS) engine which allows the sentio codec to select a suitable encoding engine or device. The sentio codec is capable of encoding and transmitting data streams that correspond to participant experiences with a variety of different dimensions and features. As will be appreciated, the following description provides one paradigm for understanding the multi-dimensional experience available to the participants, and as implemented utilizing a sentio codec. There are many suitable ways of describing, characterizing and implementing the sentio codec and experience platform contemplated herein.

12 Claims, 7 Drawing Sheets

(51) Int. Cl.
  *H04N 21/63* (2011.01)
  *H04N 21/6377* (2011.01)
  *H04N 21/658* (2011.01)
  *H04N 21/81* (2011.01)
  *H04N 19/12* (2014.01)
  *H04N 19/156* (2014.01)
  *H04N 19/164* (2014.01)

(52) U.S. Cl.
  CPC ......... *H04N 21/6377* (2013.01); *H04N 21/658* (2013.01); *H04N 21/8146* (2013.01)

(56) References Cited

U.S. PATENT DOCUMENTS

| | | |
|---|---|---|
| 7,171,485 B2 | 1/2007 | Roach et al. |
| 7,351,149 B1 | 4/2008 | Simon et al. |
| 7,516,255 B1 * | 4/2009 | Hobbs .......................... 348/474 |
| 7,529,259 B2 | 5/2009 | Van Acker et al. |
| 7,760,640 B2 | 7/2010 | Brown et al. |
| 8,132,111 B2 | 3/2012 | Baron et al. |
| 8,150,757 B1 | 4/2012 | Sieffert et al. |
| 8,171,154 B2 | 5/2012 | Vonog et al. |
| 8,234,398 B2 | 7/2012 | Vonog et al. |
| 8,255,552 B2 | 8/2012 | Witt et al. |
| 8,429,704 B2 | 4/2013 | Vonog et al. |
| 8,463,677 B2 | 6/2013 | Vonog et al. |
| 2002/0051493 A1 * | 5/2002 | Shin et al. ................ 375/240.11 |
| 2003/0074474 A1 | 4/2003 | Roach et al. |
| 2003/0074554 A1 | 4/2003 | Roach et al. |
| 2003/0188320 A1 | 10/2003 | Shing |
| 2003/0217170 A1 | 11/2003 | Nelson et al. |
| 2004/0128350 A1 * | 7/2004 | Topfl et al. ...................... 345/757 |
| 2005/0100100 A1 * | 5/2005 | Unger ..................... 375/240.27 |
| 2006/0183547 A1 | 8/2006 | McMonigle |
| 2007/0094691 A1 | 4/2007 | Gazdzinski |
| 2007/0217436 A1 | 9/2007 | Markley et al. |
| 2007/0271580 A1 | 11/2007 | Tischer et al. |
| 2008/0004888 A1 | 1/2008 | Davis |
| 2008/0039205 A1 | 2/2008 | Ackley et al. |
| 2008/0056718 A1 | 3/2008 | Parker |
| 2008/0064490 A1 | 3/2008 | Ellis |
| 2008/0068449 A1 | 3/2008 | Wu et al. |
| 2008/0134235 A1 | 6/2008 | Kalaboukis |
| 2008/0139301 A1 | 6/2008 | Holthe |
| 2008/0158373 A1 | 7/2008 | Chu |
| 2008/0181260 A1 * | 7/2008 | Vonog et al. .................. 370/519 |
| 2008/0195956 A1 | 8/2008 | Baron |
| 2008/0205426 A1 | 8/2008 | Grover et al. |
| 2008/0267447 A1 | 10/2008 | Kelusky et al. |
| 2009/0013263 A1 | 1/2009 | Fortnow et al. |
| 2009/0046139 A1 | 2/2009 | Cutler et al. |
| 2009/0100452 A1 | 4/2009 | Hudgeons et al. |
| 2009/0115843 A1 | 5/2009 | Sohmers |
| 2009/0118017 A1 * | 5/2009 | Perlman et al. ................. 463/42 |
| 2009/0183205 A1 | 7/2009 | McCartie et al. |
| 2009/0186700 A1 | 7/2009 | Konkle |
| 2009/0239587 A1 * | 9/2009 | Negron et al. ................ 455/566 |
| 2009/0309846 A1 | 12/2009 | Trachtenberg et al. |
| 2010/0004977 A1 | 1/2010 | Marci et al. |
| 2010/0113140 A1 | 5/2010 | Kelly et al. |
| 2010/0149096 A1 * | 6/2010 | Migos et al. ................... 345/158 |
| 2010/0156812 A1 * | 6/2010 | Stallings et al. .............. 345/173 |
| 2010/0185514 A1 | 7/2010 | Glazer |
| 2010/0191859 A1 | 7/2010 | Raveendran |
| 2010/0257251 A1 | 10/2010 | Mooring et al. |
| 2010/0268843 A1 | 10/2010 | Van Wie et al. |
| 2010/0278508 A1 | 11/2010 | Aggarwal |
| 2011/0046980 A1 | 2/2011 | Metzler et al. |
| 2011/0103374 A1 | 5/2011 | Lajoie et al. |
| 2011/0116540 A1 * | 5/2011 | O'Connor et al. ....... 375/240.02 |
| 2011/0145817 A1 | 6/2011 | Grzybowski |
| 2011/0151976 A1 | 6/2011 | Holloway et al. |
| 2011/0163944 A1 | 7/2011 | Bilbrey et al. |
| 2011/0175822 A1 | 7/2011 | Poon et al. |
| 2011/0209089 A1 | 8/2011 | Hinckley et al. |
| 2011/0225515 A1 | 9/2011 | Goldman et al. |
| 2011/0244954 A1 | 10/2011 | Goldman et al. |
| 2011/0246908 A1 | 10/2011 | Akram et al. |
| 2011/0271208 A1 | 11/2011 | Jones et al. |
| 2011/0292181 A1 | 12/2011 | Acharya et al. |
| 2011/0298827 A1 | 12/2011 | Perez |
| 2011/0302532 A1 | 12/2011 | Missig |
| 2012/0038550 A1 | 2/2012 | Lemmey et al. |
| 2012/0039382 A1 | 2/2012 | Vonog et al. |
| 2012/0041859 A1 | 2/2012 | Vonog et al. |
| 2012/0041869 A1 | 2/2012 | Glodjo et al. |
| 2012/0060101 A1 | 3/2012 | Vonog et al. |
| 2012/0078788 A1 | 3/2012 | Gandhi |
| 2012/0082226 A1 | 4/2012 | Weber |
| 2012/0084738 A1 | 4/2012 | Sirpal |
| 2012/0127100 A1 | 5/2012 | Forte et al. |
| 2012/0131458 A1 | 5/2012 | Hayes |
| 2012/0134409 A1 | 5/2012 | Vonog et al. |
| 2012/0191586 A1 | 7/2012 | Vonog et al. |
| 2012/0206262 A1 | 8/2012 | Grasso |
| 2012/0206558 A1 | 8/2012 | Setton |
| 2012/0206560 A1 | 8/2012 | Setton |
| 2012/0272162 A1 | 10/2012 | Surin et al. |
| 2013/0019184 A1 | 1/2013 | Vonog et al. |
| 2013/0050080 A1 | 2/2013 | Dahl et al. |
| 2013/0339222 A1 | 12/2013 | Vonog et al. |

FOREIGN PATENT DOCUMENTS

| | | |
|---|---|---|
| KR | 10-2006-0062381 A | 6/2006 |
| KR | 2006-0083034 A | 7/2006 |
| KR | 10-2008-0008340 A | 1/2008 |
| KR | 10-2009-0113158 A | 10/2009 |
| KR | 10-2010-0098668 A | 9/2010 |
| WO | WO-02-41121 A2 | 5/2002 |
| WO | WO 2007084994 A2 * | 7/2007 |
| WO | WO-/2008/072923 A1 | 6/2008 |

OTHER PUBLICATIONS

Written Opinion mailed May 16, 2012 of PCT Application No. PCT/US2011/057385, 4 pages.
Co-Pending U.S. Appl. No. 13/279,096 of Vonog, S., et al., filed Oct. 21, 2011.
Co-Pending U.S. Appl. No. 13/461,680 of Vonog, S., et al., filed May 1, 2012.
Co-Pending U.S. Appl. No. 13/546,906 of Vonog, S., et al., filed Jul. 11, 2012.
Co-Pending U.S. Appl. No. 13/694,582, filed Dec. 12, 2012.
Co-Pending U.S. Appl. No. 13/694,581, filed Dec. 12, 2012.
Non-Final Office Action mailed Sep. 11, 2012, in Co-Pending U.S. Appl. No. 13/136,869, filed Sep. 7, 2012.
Notice of Allowance mailed Feb. 4, 2013, in Co-Pending U.S. Appl. No. 13/279,096, filed Oct. 21, 2011.
Co-Pending U.S. Appl. No. 13/136,869 of Vonog, S., et al., filed Aug. 12, 2011.
Co-Pending U.S. Appl. No. 13/367,146 of Vonog, S., et al., filed Feb. 6, 2012.
Co-Pending U.S. Appl. No. 13/363,187 of Vonog, S., et al., filed Jan. 31, 2012.
Co-Pending U.S. Appl. No. 13/221,801 of Vonog, S., et al., filed Aug. 30, 2011.
Ettin, Scott A.; "Band of the Hand: Handheld Media Platforms from Palm OS to Pocket PC Pose New Challenges to Video Producers, But They Also Present New Opportunities"; Emedia, The Digital Studio Magazine; 16, 1, 44(2) (Jan. 2003).
Moote, et al.; "Moving Toward a Dual-Infrastructure Facility"; Broadcast Engineering; vol. 46, No. 9, pp. 72-78 (Sep. 2004).
"Broadcom Announces Industry's Most Advanced High Definition AVC Encoder/Transcoder that Transforms the PC into a Multimedia Server"; PR Newswire (Jan. 7, 2008).
Notice of Allowance mailed Sep. 4, 2013, in Co-Pending U.S. Appl. No. 13/367,146 of Vonog, S., et al., filed Feb. 6, 2012.
Final Office Action mailed Aug. 15, 2013, in Co-Pending U.S. Appl. No. 13/221,801 of Vonog, S., et al., filed Aug. 30, 2011.

(56) References Cited

OTHER PUBLICATIONS

Co-Pending U.S. Appl. No. 13/210,370 of Lemmey, T., et al., filed Aug. 15, 2011.
International Search Report PCT/US2011/047814 dated Apr. 9, 2012, pp. 1-3.
International Search Report PCT/US2011/047815 dated Apr. 9, 2012, pp. 1-3.
Written Opinion PCT/US2011/047814 dated Apr. 9, 2012, pp. 1-5.
Written Opinion PCT/US2011/047815 dated Apr. 9, 2012, pp. 1-4.
International Search Report PCT/US2011/001424 dated Apr. 6, 2012, pp. 1-3.
Written Opinion PCT/US2011/001424 dated Apr. 6, 2012, pp. 1-3.
International Search Report PCT/US2011/001425 dated Apr. 6, 2012, pp. 1-3.
Written Opinion PCT/US2011/001425 dated Apr. 6, 2012, pp. 1-3.
Co-Pending U.S. Appl. No. 13/762,149 of Vonog. S.,, filed Feb. 7, 2013.
Notice of Allowance mailed Apr. 3, 2013, in Co-Pending U.S. Appl. No. 13/163,869, filed Sep. 7, 2012.
Non-Final Office Action mailed Mar. 19, 2013, in Co-Pending U.S. Appl. No. 13/367,146, filed Feb. 6, 2012.
Non-Final Office Action mailed Apr. 1, 2013, in Co-Pending U.S. Appl. No. 13/221,801, filed Aug. 30, 2011.
Ghezzi, A. et al. "Mobile Content and Service Delivery Platforms: A Technology Classification Model"; Info: the Journal of Policy, Regulation and Strategy for Telecommunications, Information and Media; vol. 14, No. 2, pp. 72-88 (2012).
Kwan, W.B., "Personalized Multimedia News Agents in a Broadband Environment"; Ottawa-Carleton Institute of Electrical Engineering (Sep. 1996).
Notice of Allowance mailed Oct. 3, 2014, for U.S. Appl. No. 13/874,319, filed Apr. 30, 2013.
Notice of Allowance mailed Mar. 18, 2013, in U.S. Appl. No. 13/279,096 of Vonog, S., et al., filed Oct. 21, 2011.
Notice of Allowance mailed Oct. 23, 2013, U.S. Appl. No. 13/762,149 of Vonog. S., filed Feb. 7, 2013.
Notice of Allowance mailed Dec. 5, 2013, U.S. Appl. No. 13/762,149 of Vonog. S., filed Feb. 7, 2013.
Notice of Allowance mailed Mar. 14, 2014, U.S. Appl. No. 13/762,149 of Vonog. S., filed Feb. 7, 2013.
Final Office Action mailed Apr. 23, 2015, in U.S. Appl. No. 13/210,370 with a filing date of Aug. 15, 2011.
Non-Final Office Action mailed Feb. 26, 2015, in U.S. Appl. No. 13/461,680 with a filing date of May 1, 2012.
Restriction Requirement mailed on Sep. 24, 2013, for U.S. Appl. No. 13/694,582 of Lemmey, T., et al., filed Dec. 12, 2012.
Restriction Requirement mailed on Apr. 21, 2014, for U.S. Appl. No. 13/694,582 of Lemmey, T., et al., filed Dec. 12, 2012.
Non-Final Office Action mailed on Mar. 31, 2015, for U.S. Appl. No. 13/694,582 of Lemmey, T., et al., filed Dec. 12, 2012.
Non-Final Office Action mailed Oct. 29, 2014, for U.S. Appl. No. 13/694,581 of Vonog, S., et al., filed Dec. 12, 2012.
Non-Final Office Action of U.S. Appl. No. 13/874,319 with a mailing date of Jan. 6, 2014.
Final Office Action of U.S. Appl. No. 13/874,319 with a mailing date of Jan. 6, 2014.
Non-Final Office Action mailed Jun. 19, 2014, in Co-Pending U.S. Appl. No. 13/210,370 with a filing date of Aug. 15, 2011.
Non-Final Office Action mailed Jul. 9, 2014, in Co-Pending U.S. Appl. No. 13/461,680 with a filing date of May 1, 2012.
Non-Final Office Action mailed Aug. 15, 2014, in Co-Pending U.S. Appl. No. 13/221,801 of Vonog, S., et al., filed Aug. 30, 2011.

* cited by examiner

Sentio Code Multiple Encodings for different networks/devices

*FIG. 3*

Example of Sentio Codec for simple configurations

EXPERIENCE OR "SENTIO" CODECS, AND METHODS AND SYSTEMS FOR IMPROVING QOE AND ENCODING BASED ON QOE EXPERIENCES

CLAIM OF PRIORITY

The present application claims priority to the following U.S. Provisional Applications: U.S. Provisional Patent Application No. 61/373,236, entitled "EXPERIENCE OR "SENTIO" CODECS, AND METHODS AND SYSTEMS FOR IMPROVING QoE AND ENCODING BASED ON QoE FOR EXPERIENCES," filed on Aug. 12, 2010, and U.S. Provisional Patent Application No. 61/373,229, entitled "METHOD AND SYSTEM FOR A SIMPLE OPERATING SYSTEM AS AN EXPERIENCE CODEC," filed on Aug. 12, 2010, both of which are incorporated in their entireties herein by this reference.

FIELD OF INVENTION

The present teaching relates to experience or "sentio" codecs enabling adaptive encoding and transmission for heterogeneous data streams of different nature involving a variety of content and data types including video, audio, physical gesture, geo-location, voice input, synchronization events, computer-generated graphics etc. "Sentio" codec expands the existing concept of codecs by to maximize final Quality of Service/Experience in real-time, heterogeneous network, multi-device, social environment.

SUMMARY OF THE INVENTION

The present invention contemplates a variety of experience or "sentio" codecs, and methods and systems for enabling an experience platform, as well as a Quality of Experience (QoE) engine which allows the sentio codec to select a suitable encoding engine or device. "Sentio" codec expands the existing concept of codec to work in real-time, heterogeneous network, multi-device, social environment to maximize final Quality of Service/Experience.

As will be described in more detail below, the sentio codec is capable of encoding and transmitting data streams that correspond to participant experiences with a variety of different dimensions and features. As will be appreciated, the following description provides one paradigm for understanding the multi-dimensional experience available to the participants, and as implemented utilizing a sentio codec. There are many suitable ways of describing, characterizing and implementing the sentio codec and experience platform contemplated herein.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

The present invention contemplates a variety of experience or "sentio" codecs, and methods and systems for enabling an experience platform, as well as a Quality of Experience (QoS) engine which allows the sentio codec to select a suitable encoding engine or device. As will be described in more detail below, the sentio codec is capable of encoding and transmitting data streams that correspond to participant experiences with a variety of different dimensions and features. (The term "sentio" is Latin roughly corresponding to perception or to perceive with one's senses, hence the original nomenclature "sensio codec.")

The primary goal of a video codec is to achieve maximum compression rate for digital video while maintaining great picture quality video; audio codecs are similar. But video and audio codecs alone are insufficient to generate and capture a full experience, such as a real-time experience enabled by hybrid encoding, and encoding of other experience aspects such as gestures, emotions, etc.

Figure 2:
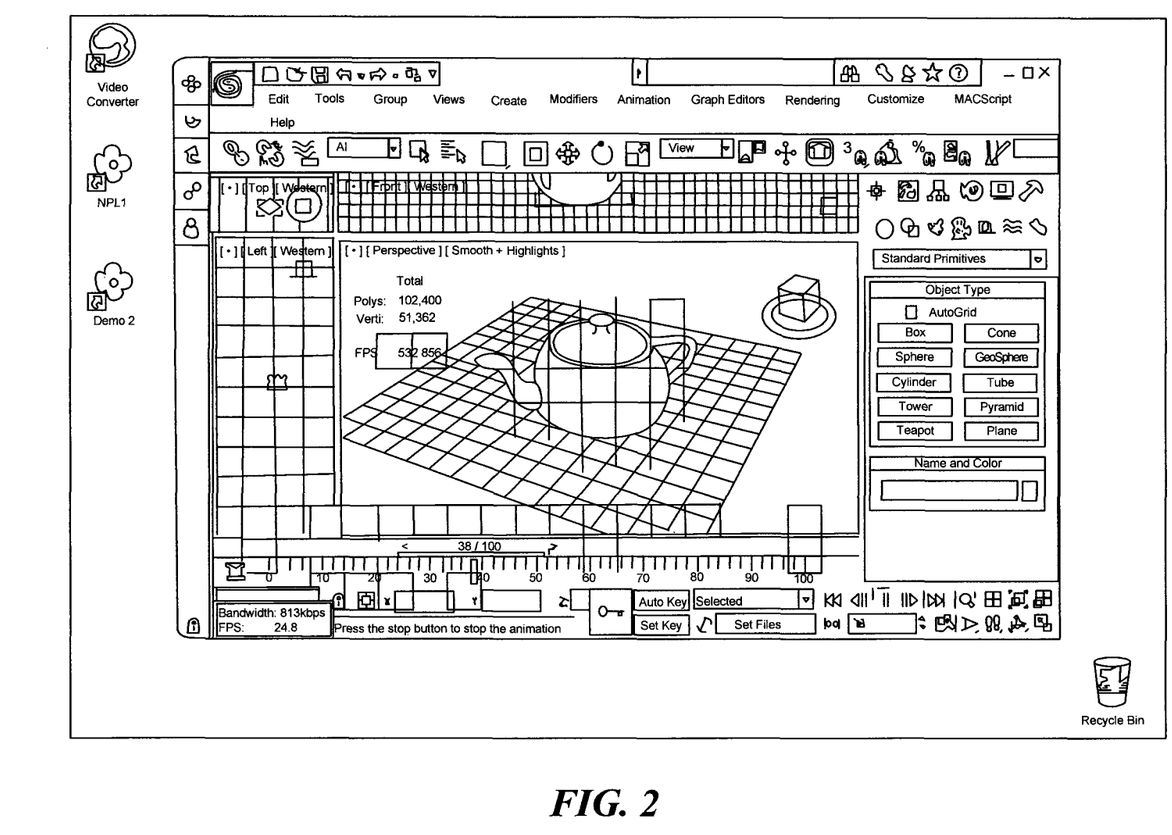
FIG. 2 provides a screen shot useful for illustrating how a hybrid encoding scheme can be used to accomplish low-latency transmission.

FIG. 2 will now be described to provide an example experience showing 4 layers where video encoding alone is inadequate under constrained network connectivity conditions (low bandwidth, high packet loss or jitter, etc.) A first layer is generated by Autodesk 3ds Max instantiated on a suitable layer source, such as on an experience server or a content server. A second layer is an interactive frame around the 3ds Max layer, and in this example is generated on a client device by an experience agent. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of region-detection code (e.g., different regions being selectively encoded) and is generated and computed on the service platform, and then merged with the 3ds Max layer on the experience server.

Figure 3:
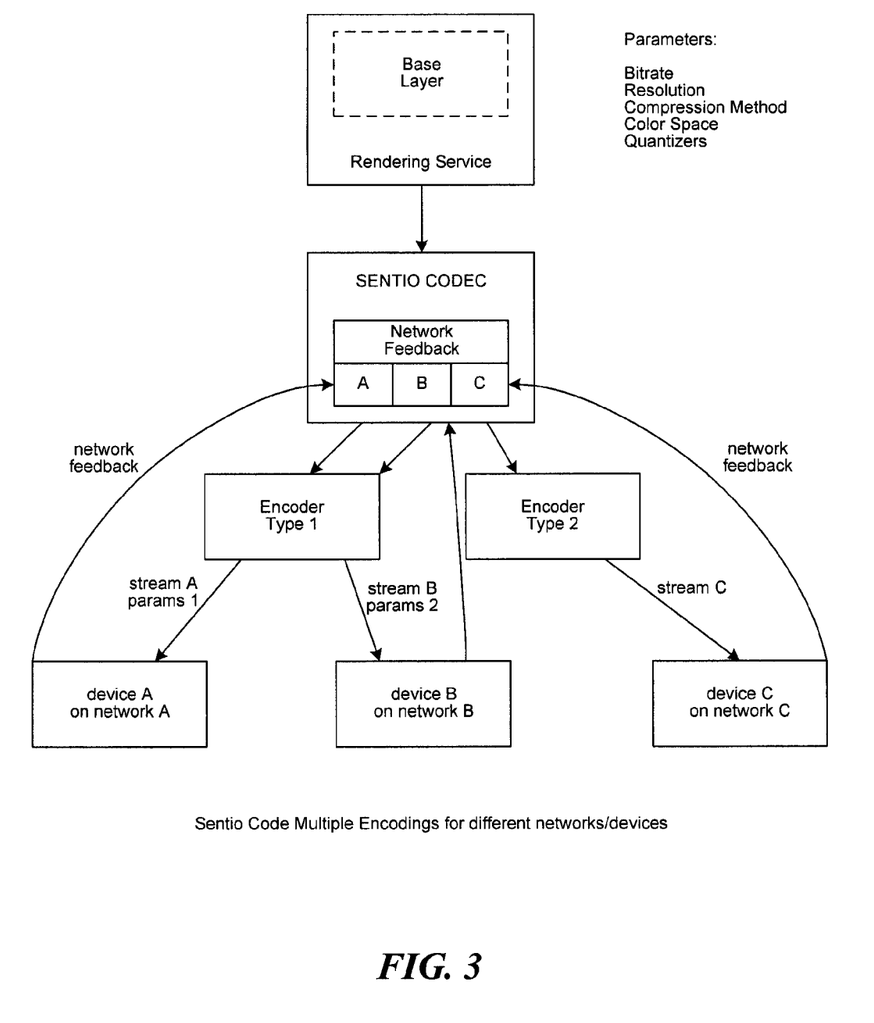
FIG. 3 is a block diagram of "sentio" codec model that shows event, data streams, different encoders selection based on device capabilities and network feedback.
Figure 4:
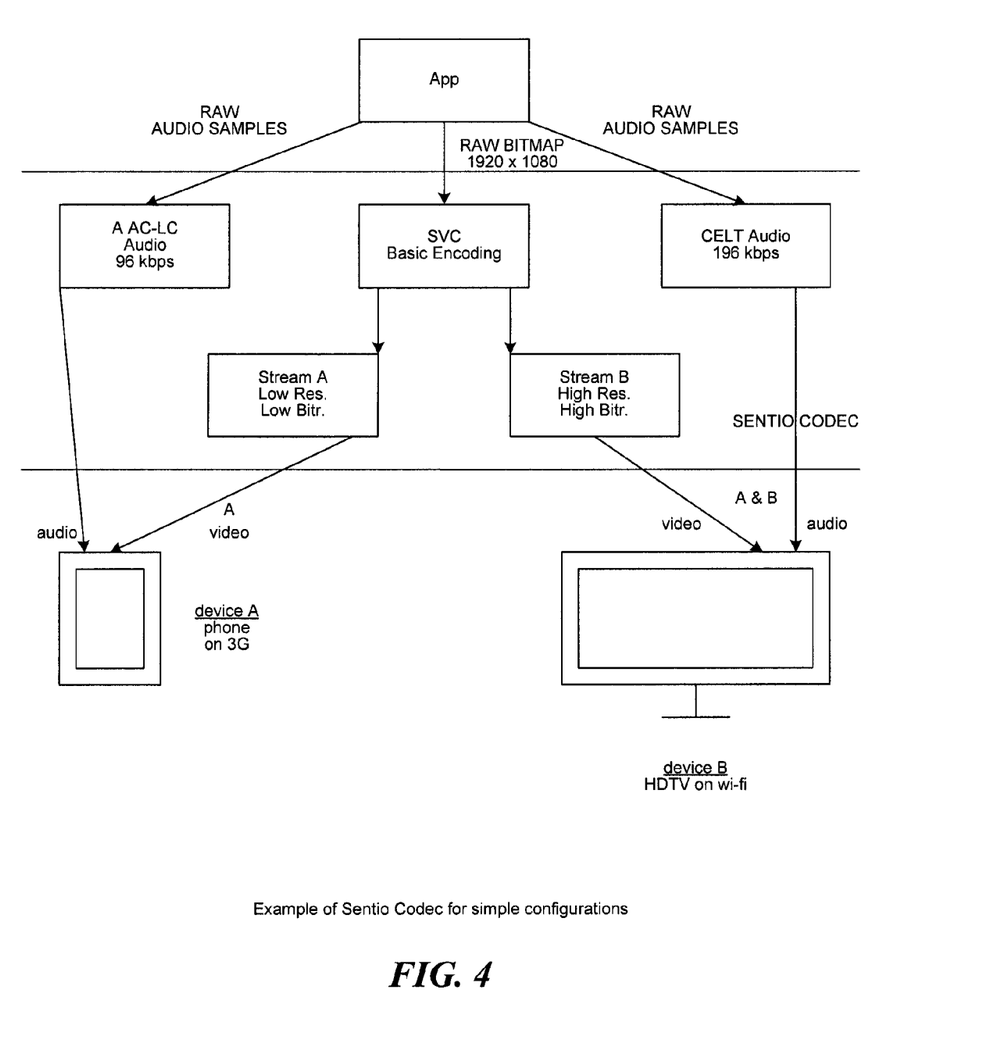
FIG. 4 illustrates an exemplary selection of particular codec based on device capabilities (screen size in the example) and network type (3G vs Wi-Fi in the example)

FIGS. 2 3 and 4 illustrate hybrid encoding approaches can be used to accomplish low-latency transmission. The first layer provides an Autodesk 3ds Max image including a rotating teapot, the first layer moving images, static or nearly static images, and graphic and/or text portions. Rather then encoding all the information with a video encoder alone, a hybrid approach encoding some regions with a video encoder, other regions with a picture encoder, and other portions as command, results in better transmission results, and can be optimized based on factors such as the state of the network and the capabilities of end devices. These different encoding regions are illustrated by the different coloring of the red-green-yellow grid of layer 4. One example of this low-latency protocol is described in more detail in Vonog et al.'s U.S. patent application Ser. No. 12/569,876, filed Sep. 29, 2009, and incorporated herein by reference for all purposes including the low-latency protocol and related features such as the network engine and network stack arrangement.

Figure 5:
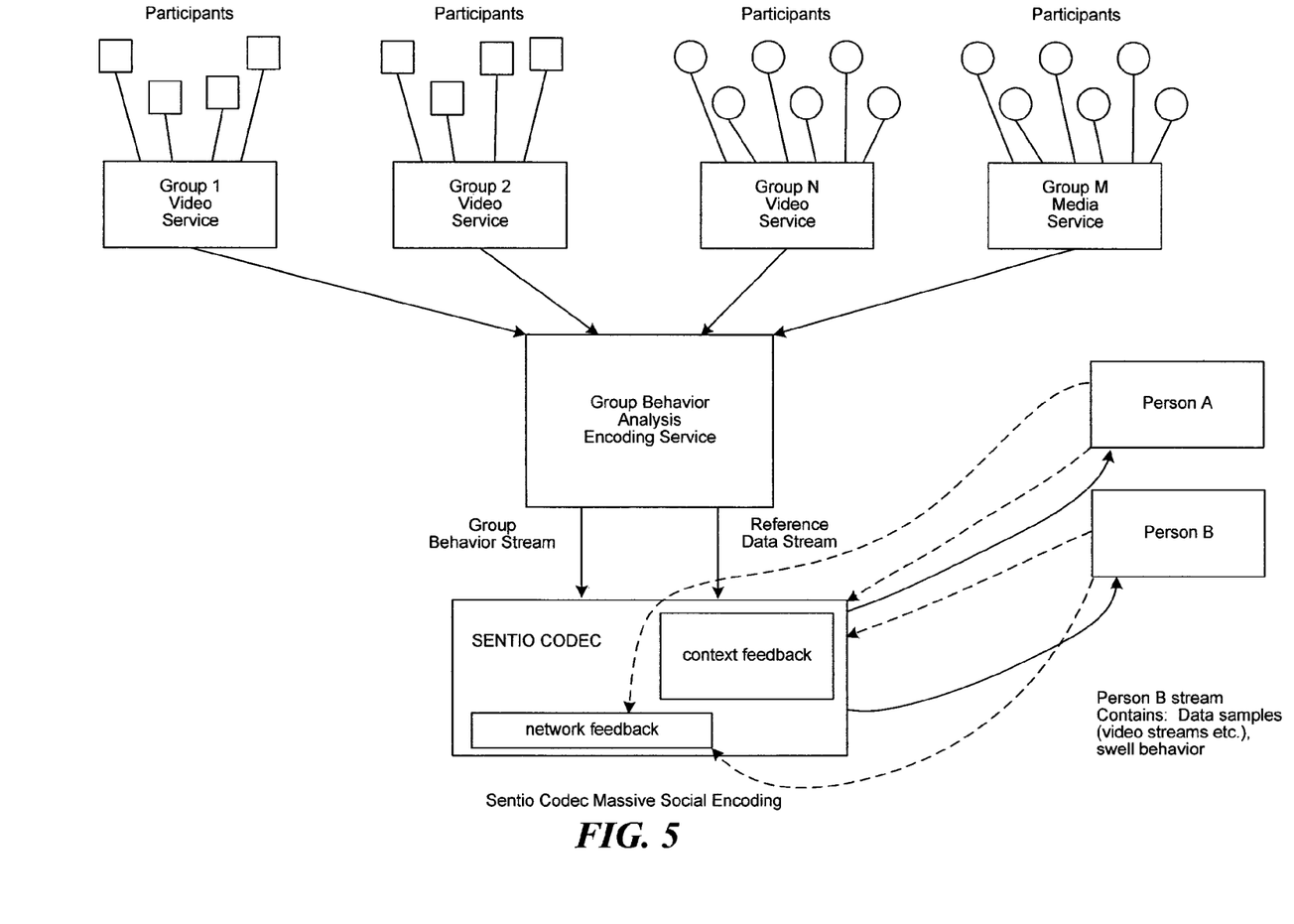
FIG. 5 is a block diagram of "sentio" codec model that shows event, data streams, different encoders selection, applying specific group analysis services in massive social environment.

FIG. 3 is a block diagram of "sentio" codec model that shows event, data streams, different encoders selection based on device capabilities and network feedback. FIG. 4. illustrates an exemplary selection of particular codec based on device capabilities (screen size in the example) and network type (3G vs Wi-Fi in the example). FIG. 5. is a block diagram of "sentio" codec model that shows event, data streams, different encoders selection, applying specific group analysis services in massive social environment.

A video codec alone is inadequate to accomplish the hybrid encoding scheme covering video, pictures and commands. While it is theoretically possible to encode the entire first layer using only a video codec, latency and other issues can prohibit real-time and/or quality experiences. A low-latency protocol can solve this problem by efficiently encoding the data.

In another example, a multiplicity of video codecs can be used to improve encoding and transmission. For example, h.264 can be used if a hardware decoder is available, thus saving battery life and improving performance, or a better video codec (e.g., low latency) can be used if the device fails to support h.264.

As yet another example, consider the case of multiple mediums where an ability to take into account the nature of human perception would be beneficial. For example, assume we have video and audio information. If network quality degrades, it could be better to prioritize audio and allow the video to degrade. To do so would require using psychoacoustics to improve the QoE.

Accordingly, the present teaching contemplates an experience or sentio codec capable of encoding and transmitting data streams that correspond to experiences with a variety of different dimensions and features. These dimensions include known audio and video, but further may include any conceivable element of a participant experience, such as gestures, gestures+voice commands, "game mechanics" (which you can use to boost QoE when current conditions (such as network) do not allow you to do so—i.e. apply sound distortion effect specific to a given experience when loss of data happened), emotions (perhaps as detected via voice or facial expressions, various sensor data, microphone input, etc.

It is also contemplated that virtual experiences can be encoded via the sentio codec. According to one embodiment, virtual goods are evolved into virtual experiences. Virtual experiences expand upon limitations imposed by virtual goods by adding additional dimensions to the virtual goods. By way of example, User A transmits flowers as a virtual good to User B. The transmission of the virtual flowers is enhanced by adding emotion by way of sound, for example. The virtual flowers are also changed to a virtual experience when User B can do something with the flowers, for example User B can affect the flowers through any sort of motion or gesture. User A can also transmit the virtual goods to User B by making a "throwing" gesture using a mobile device, so as to "toss" the virtual goods to User B.

The sentio codec improves the QoE to a consumer or experience participant on the device of their choice. This is accomplished through a variety of mechanisms, selected and implemented, possibly dynamically, based on the specific application and available resources. In certain embodiments, the sentio codec encodes multi-dimensional data streams in real-time, adapting to network capability. A QoE engine operating within the sentio codec a makes decisions on how to use different available codecs. The network stack can be implemented as hybrid, as described above, and in further detail with reference to Vonog et al.'s U.S. patent application Ser. No. 12/569,876.

The sentio codec can include 1) a variety of codecs for each segment of experience described above, 2) a hybrid network stack with network intelligence, 3) data about available devices, and 4) a QoE engine that makes decisions on how to encode. It will be appreciated that QoE is achieved through various strategies that work differently for each given experience (say a zombie karaoke game vs. live stadium rock concert experience), and adapt in real-time to the network and other available resources, know the devices involved and take advantages of various psychological tricks to conceal imperfections which inevitably arise, particularly when the provided experience is scaled for many participants and devices.

Figure 1:
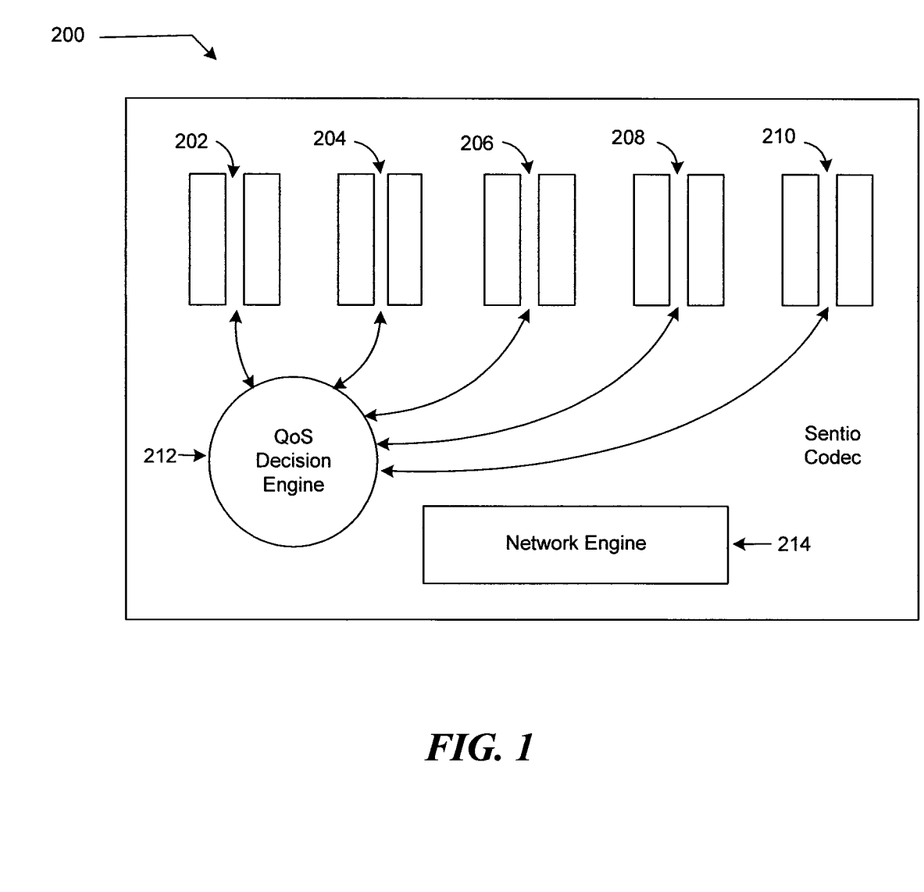
FIG. 1 is a block diagram of a sentio codec.

FIG. 1 illustrates a block diagram of one embodiment of a sentio codec 200. The sentio codec 200 includes a plurality of codecs such as video codecs 202, audio codecs 204, graphic language codecs 206, sensor data codecs 208, and emotion codecs 210. The sentio codec 200 further includes a quality of experience (QoE) decision engine 212 and a network engine 214. The codecs, the QoE decision engine 212, and the network engine 214 work together to encode one or more data streams and transmit the encoded data according to a low-latency transfer protocol supporting the various encoded data types. One suitable low-latency protocol and more details related to the network engine 214 can be found in Vonog et al.'s U.S. patent application Ser. No. 12/569,876.

The sentio codec 200 can be designed to take all aspects of the experience platform into consideration when executing the transfer protocol. The parameters and aspects include available network bandwidth, transmission device characteristics and receiving device characteristics. Additionally, the sentio codec 200 can be implemented to be responsive to commands from an experience composition engine or other outside entity to determine how to prioritize data for transmission. In many applications, because of human response, audio is the most important component of an experience data stream. However, a specific application may desire to emphasize video or gesture commands.

The sentio codec provides the capability of encoding data streams corresponding to many different senses or dimensions of an experience. For example, a device 12 may include a video camera capturing video images and audio from a participant. The user image and audio data may be encoded and transmitted directly or, perhaps after some intermediate processing, via the experience composition engine 48, to the service platform 46 where one or a combination of the service engines can analyze the data stream to make a determination about an emotion of the participant. This emotion can then be encoded by the sentio codec and transmitted to the experience composition engine 48, which in turn can incorporate this into a dimension of the experience. Similarly a participant gesture can be captured as a data stream, e.g. by a motion sensor or a camera on device 12, and then transmitted to the service platform 46, where the gesture can be interpreted, and transmitted to the experience composition engine 48 or directly back to one or more devices 12 for incorporation into a dimension of the experience.

The sentio codec delivers the best QoE to a consumer on the device of their choice through current network. This is accomplished through a variety of mechanisms, selected and implemented based on the specific application and available resources. In certain embodiments, the sentio codec encodes multi-dimensional data streams in real-time, adapting to network capability. A QoE engine operating within the sentio codec a makes decisions on how to use different available codecs. The network stack can be implemented as hybrid, as described above, and in further detail with reference to Vonog et al.'s U.S. patent application Ser. No. 12/569,876.

Additionally, the following description is related to a simple operating system, which follows generally the fundamental concepts discussed above with further distinctions. In a cloud computing environment, a server communicates with a first device, wherein the first device can detect surrounding devices, and an application program is executable by the server, wherein the application program is controlled by the first device and the output of the application program is directed by the server to one of the devices detected by the first device.

According to one embodiment, a minimum set of requirements exists in order for the first device to detect and interact with other devices in the cloud computing environment. A traditional operating system is inappropriate for such enablement because the device does not need full operating system capabilities. Instead, a plurality of codecs is sufficient to enable device interaction.

Figure 6:
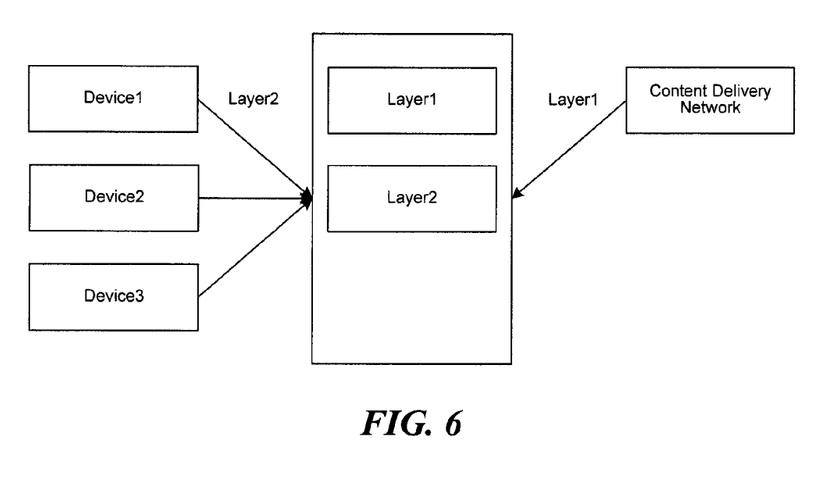
FIG. 6 illustrates an ensemble of devices interacting and their output streamed to and displayed on a single display.

FIG. 6 illustrates an ensemble of devices interacting and their output streamed to and displayed on a single display. Multiple users having devices participate in an activity, for example watching live sports. The video of the live sports is streamed as a layer (layer1) from a content delivery network and displayed to the users. A user having device1 can play the role of commentator and the audio from device1 is streamed as a layer (layer2) and rendered to the users. A user having device2 can, for example, be drawing plays and the drawings are streamed as another layer and displayed to the users. A user having device3 can, for example, be typing up facts that are streamed as another layer and displayed to the users as a ticker tape. The devices and users make an ensemble in that they have different roles and experiences together while participating in the same activity.

Figure 7:
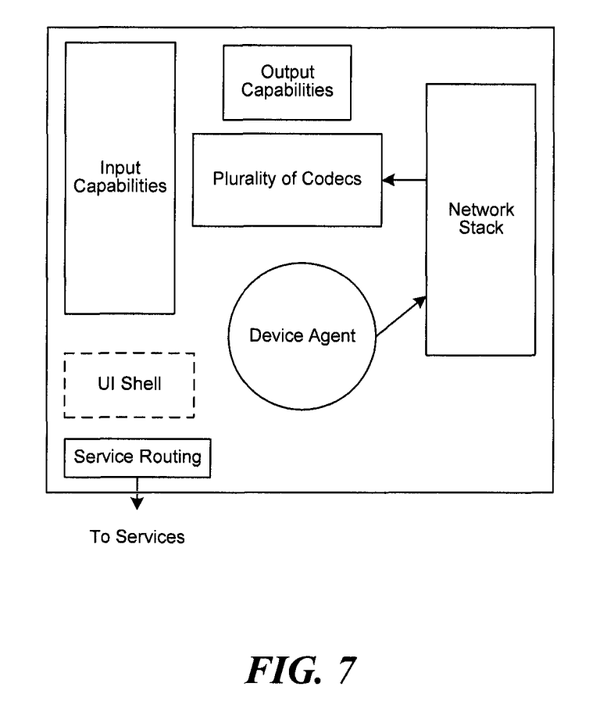
FIG. 7 illustrates an exemplary architecture of a simple operating system.

FIG. 7 illustrates an exemplary architecture of a simple operating system. A simple operating system includes input capabilities, output capabilities, a network stack, a device agent, a plurality of codecs, services routing and an optional user interface shell. The simple operating system receives input including requests for services, and routes the requests for services to the appropriate available computing capabilities.

According to one embodiment, the simple operating system performs minimal input processing to decipher what services are being requested, only to determine where to route the request. The device agent provides information regarding the location of best computing available for a particular request.

According to one embodiment, the simple operating system performs no input processing and automatically routes input for processing to another device or to the cloud.

According to one embodiment, the simple operating system routes requests for services to another device, to a server in the cloud, or to computing capability available locally on the device hosting the simple operating system.

According to one embodiment, the plurality of codecs maintain a network connection and can activate output capabilities.

According to one embodiment, the simple operating system does not include any local services. All requests are sent to the cloud for services.

According to one embodiment, a device hosting the simple operating system can also host a traditional operating system.

Services are defined at the API Layer of the platform. Services are categorized into Dimensions. Dimensions can be recombined into Layers. Layers form to make features in the user experience.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

I claim:

1. A sentio codec for encoding and decoding a plurality of multi-dimensional data streams for a multi-dimensional experience, the sentio codec comprising:
   a plurality of codecs suitable for encoding and decoding multi-dimensional experience data streams related to a multi-dimensional experience;
   a quality of experience ("QoE") engine;
   wherein the QoE engine is configured to:
      receive an output associated with the multi-dimensional experience, wherein the output is divided into a plurality of regions;
      receive data associated with the capabilities of a transmitting device and a receiving device;
      wherein, the transmitting device and the receiving device are connected via a network;
      receive data associated with the current conditions of the network;
      cause one or more of the plurality of codecs to encode each of the regions of the output into one or more of the plurality of multi-dimensional data streams;
      wherein, the encoding of each region is based on the data associated with the capabilities of the transmitting device, the data associated with the capabilities of the receiving device, and the data associated with the current conditions of the network; and
   a network stack;
   wherein, the network stack implements a low-latency transfer protocol suitable for enabling a multi-dimensional experience;
   wherein the network stack is configured to cause the transmitting device to transmit the encoded plurality of multi-dimensional data streams according to the low-latency transfer protocol;
   wherein, the transmitting includes:
      parsing the encoded plurality of data streams into a reliable queue, an unreliable queue, and an unreliable with forward error correction queue, wherein each queue has a plurality of channels, each channel associated with a priority;
      transmitting the reliable queue, wherein each packet in the reliable queue is acknowledged by the receiving device and includes a reliable packet sequence number;
      transmitting the unreliable queue, wherein each packet in the unreliable queue includes an unreliable packet sequence number; and
      transmitting the unreliable with forward error correction queue, wherein each packet in the unreliable with forward error correction queue includes a transform code containing redundant information to recover lost packets.

2. A sentio codec as recited in claim 1, wherein the plurality of codecs includes an audio codec and a video codec.

3. A sentio codec as recited in claim 2, wherein the plurality of codecs further includes a gesture command codec.

4. A sentio codec as recited in claim 2, wherein the plurality of codecs further includes a sensor data codec.

5. A sentio codec as recited in claim 2, wherein the plurality of codecs further includes an emotion data codec.

6. A sentio codec as recited in claim 1, wherein the encoding of each region is further based on a characteristics of the output in each region.

7. A method for encoding and transmitting a plurality of multi-dimensional data streams for a multi-dimensional experience, by a sentio codec, the method comprising:
  receiving, by a quality of experience ("QoE") engine, an output associated with the multi-dimensional experience, wherein the output is divided into a plurality of regions;
  receiving, by the QoE engine, data associated with the capabilities of a transmitting device and a receiving device, wherein, the transmitting device and the receiving device are connected via a network;
  receiving, by the QoE engine, data associated with the current conditions of the network;
  selecting, by the QoE engine, one or more codecs out of a plurality of codecs with which to encode each region of the output based on the data associated with the capabilities of the transmitting device, the data associated with the capabilities of the receiving device, and the data associated with the current conditions of the network;
  encoding, by one or more of the plurality codecs, based on the selection by the QoE engine, each of the regions of the output into one or more of the plurality of multi-dimensional data streams; and
  transmitting, by the transmitting device, using the network stack, the encoded plurality of multi-dimensional data streams, according to a low-latency transfer protocol;
  wherein, the transmitting includes:
    parsing the encoded plurality of data streams into a reliable queue, an unreliable queue, and an unreliable with forward error correction queue, wherein each queue has a plurality of channels, each channel associated with a priority;
    transmitting the reliable queue, wherein each packet in the reliable queue is acknowledged by the receiving device and includes a reliable packet sequence number;
    transmitting the unreliable queue, wherein each packet in the unreliable queue includes an unreliable packet sequence number; and
    transmitting the unreliable with forward error correction queue, wherein each packet in the unreliable with forward error correction queue includes a transform code containing redundant information to recover lost packets.

8. A method as recited in claim 7, wherein the plurality of codecs includes an audio codec and a video codec.

9. A method as recited in claim 8, wherein the plurality of codecs further includes a gesture command codec.

10. A method as recited in claim 8, wherein the plurality of codecs further includes a sensor data codec.

11. A method as recited in claim 8, wherein the plurality of codecs further includes an emotion data codec.

12. A method as recited in claim 7, wherein the encoding of each region is further based on a characteristics of the output in each region.

* * * * *